United States Patent [19]

Kim et al.

[11] Patent Number: 5,483,295
[45] Date of Patent: Jan. 9, 1996

[54] ADAPTIVE CLAMPING CIRCUIT FOR VIDEO SIGNAL RECEIVING DEVICE

[75] Inventors: Jun-Gon Kim, Seoul; Kee-Seok Lee, Suwon, both of Rep. of Korea

[73] Assignee: Samsung Electronics Co., Ltd., Kyungki-do, Rep. of Korea

[21] Appl. No.: 241,716

[22] Filed: May 12, 1994

[30] Foreign Application Priority Data

Aug. 19, 1993 [KR] Rep. of Korea ............... 16075/1993

[51] Int. Cl.$^6$ ......................................... H04N 5/18
[52] U.S. Cl. ................................. 348/695; 348/691
[58] Field of Search ..................... 348/687, 689–698; H04N 5/16, 5/18

[56] References Cited

FOREIGN PATENT DOCUMENTS 0278176  9/1991  Japan ................. H04N 5/18
6054227  2/1994  Japan ................. H04N 5/18

*Primary Examiner*—Victor R. Kostak
*Attorney, Agent, or Firm*—Sughrue, Mion, Zinn, Macpeak & Seas

[57] ABSTRACT

An adaptive clamping circuit for a video signal processing device includes a control signal generator for generating a control signal capable of controlling a speed of clamping operation in an input signal provided to the video signal processing device, a variable response signal generator for generating a variable response gain signal which enables the input signal to be adaptively clamped by selecting a time constant which is derived from a most significant bit (MSB) and which is adaptively changed in response to the control signal from the control signal generator, and a clamping circuit producing a direct current signal from output of the variable response signal generator and for applying the direct current signal to the input signal.

11 Claims, 4 Drawing Sheets

ADAPTIVE CLAMPING CIRCUIT FOR
VIDEO SIGNAL RECEIVING DEVICE

BACKGROUND OF THE INVENTION

1. Field of the Invention

The present invention relates to a clamping circuit for a video receiving device and, more particularly, to an adaptive clamping circuit which adaptively changes an integral time constant to reproduce a reference signal interval for recovering a lost direct current signal resulting from transmission and reception of a video signal.

2. Brief Discussion of Related Art

A clamping circuit is generally used to convert a signal received through a capacitor into a signal of "0" level, e.g., a reference level. A diode and a resistance are connected in parallel with the capacitor. In this configuration, the conventional clamping circuit requires much time in which to reach an initial equilibrium state and the clamping circuit continues to operate unstably after reaching a steady state due to a time constant set equal to a predetermined value.

The fact that a clamping circuit has a large adaption time in the initial state causes a video signal to be produced in an unsteady state and causes an audio signal to be produced with a high noise content for a long period, e.g., until the steady state is reached after application of supply power. In an effort to minimize these problems, a mute operation is performed on both of the video and audio signals. Furthermore, instability during the operation of the clamping circuit in the steady state results in a level change in the video signal, which, it will noted, produces a flicker phenomenon, thereby generating errors in, e.g., the digital audio signal processing of a Multiple Sub-Nyquist Sampling Encoding (MUSE) broadcasting system. In an effort to solves this latter problem, the mute operation also must be performed for video and audio signals.

FIG. 1 shows a schematic diagram of a conventional circuit briefly described above. An analog signal input to an input terminal Ii is buffered in a buffer 101, the direct current component is cut off by a capacitor Cc and, then, the alternating current component is digitized in A/D converter 102. Thus, the signal which passes the capacitor Cc is converted into a digital signal by the A/D converter 102, which digital signal is input to a digital signal processing circuit (not shown), but only the most significant bit (MSB) and an additional bit M−1 of the digital signals are provided to a code converter 103. The MSB signal is also input to the negative terminal (−) of an operational amplifier OP1 through switches SW1, SW2 for performing a clamping action. It will be noted that the MSB signal is used for performing the clamping action because the MSB signal corresponds to a top level for all input signals.

FIG. 2 illustrates the preferred configuration for code converter 103 of FIG. 1, wherein MSB and M−1 signals are used in generating signal Q1 via an exclusive OR gate (XOR), which signal is inverted with respect to bits of a signal Q2 by an inverter N1 as indicated in the following Table 1.

TABLE 1

| MSB | M−1 | Q1 | Q2 |
|---|---|---|---|
| 1 | 1 | 1 | 0 |
| 1 | 0 | 0 | 1 |

TABLE 1-continued

| MSB | M−1 | Q1 | Q2 |
|---|---|---|---|
| 0 | 1 | 0 | 1 |
| 0 | 0 | 1 | 0 |

The output MSB and M−1 signals are input to exclusive OR gate XOR. When MSB and M−1 input signals are in the same state, the output of exclusive OR gate XOR goes "low" and, when MSB and M−1 input signals are in different states, the output of exclusive OR gate XOR goes "high". When MSB and M−1 signals are all "1", it suggests a very high input level, and, in contrast, when MSB and M−1 signals are both "0", it suggests a very low input level. It will be noted from this discussion that certain actions must be taken for rapidly varying levels of input signals represented by logic values of Q1 and Q2 of the reference level.

More specifically, in FIG. 1, the outputs Q1, Q2 of code converter 103 are input to one input of AND gates 104, 105, respectively, while the other input of AND gates 104, 105 is connected to a vertical clamp terminal VC. As shown by reference numeral 301 in FIG. 3, when the input level of the vertical clamp terminal VC is "high", the AND gates 104, 105 turn on/off switches SW1, SW2 according to the output of the code converter 103, permitting the levels of input signals to be adjusted. When switches SW1, SW2 are turned on, the MSB signal output from the A/D converter 102 is filtered by an RC filter comprising resistances R1, R3 and capacitors C1, C2. This filtered signal is then integrated in an integrating circuit 106 and, thereafter, converted into a direct current (DC) level. Then, the output of an operational amplifier OP1 us used to charge a capacitor $C_{ch}$.

The current used in charging the capacitor $C_{ch}$ is switched on/off by a horizontal clamping pulse, so as to set the direct current voltage during a horizontal duration HD portion of every line in response to a signal provided to a horizontal clamp terminal HC, as shown by reference number 302 of FIG. 3. Here, clamp levels are all within a locked 128/256 range, e.g., the neutral level of the MUSE input signal, which is set in the transmitting side.

During operation, the clamp signal is quantized as a low level corresponding to an initial state and a high level corresponding to a fully charged state of the capacitor $C_{ch}$; thus, the input codes of the code converter 103 all start at a "low" level (0). At this time, the MSB signal is in "low" state, meaning that the signal input to A/D converter 102 is a "low" level signal. As indicated in Table 1, the MSB signal is sequentially applied to resistances R1, R2, capacitors C1, C2, and negative input terminal of the operational amplifier OP1 via switches SW1, SW2 to thereby raise the charge voltage of the capacitor $C_{ch}$, whereby the signal level of direct current component applied to the A/D converter 102 is raised. At this time, switches SW1, SW2 are turned on respectively depending on the level of a clamping signal. This is because the RC time constants associated with resistances R1, R3, and capacitors C1, C2, respectively, are different from each other. During operation, switch SW1 operates at a high speed, whereas switch SW2 is a relatively low speed switch.

In performing a clamping operation, the voltage range of the clamp becomes $$\frac{RefT - RefB}{2}.$$

This voltage range makes it difficult to adjust the clamp level according to the results of the detection, and, hence, to vary the input signal levels. This is because the voltage range is too broad to stabilize the clamp level. In order to increase the clamping speed, switching speeds of switches SW1, SW2 must be increased. However, in order to stabilize the clamp level, switching speeds of switches SW1, SW2 must be reduced. It will be noted that it is not possible to satisfy all requirements regarding switching speed.

SUMMARY OF THE INVENTION

The principal object of the present invention is to provide an adaptive clamping circuit capable of shortening the adaptation time during an initial state and of stabilizing the operation state during a steady state operation by adaptively changing an integral time constant in a reference signal interval of a receiving signal.

These and other features, objects and advantages of the present invention are provided by an adaptive clamping circuit including an A/D converter for converting an input signal to a digital signal, a variable gain control means providing a gain control value for adaptively clamping the output of the A/D converter by a plurality of selectable connections having various respective time constants, an adaptive response circuit converting the output of the variable gain control means to an input signal applied by a horizontal clamping control signal to thereby adaptively respond to a direct current component of a horizontal synchronous signal of the input signal, and a control signal generator generating a control signal which controls variable gain in a clamping portion, thus permitting a clamping operation to be performed with respect to the high order bits of the data output from the A/D converter.

BRIEF DESCRIPTION OF THE DRAWINGS

These and other objects, features, and advantages of the present invention will be better understood from the following detailed description of the invention, taken in conjunction with the accompanying drawings, wherein like elements are represented by like symbols or reference numerals; and wherein.

DETAILED DESCRIPTION OF THE PREFERRED EMBODIMENTS

When a signal level received from a composite video signal is noticeably different from a reference signal level (0), the received signal is greatly damaged during image processing. To overcome this drawback, it is required to establish a reference level by performing a clamping action. When the reference level is established, the use of an adaptive time constant permits use of a small time constant during an initial state so that stability is rapidly achieved, thereby producing a steady state. This will result in a noticeable improvement in recovering the original video and sound signals.

Figure 1:
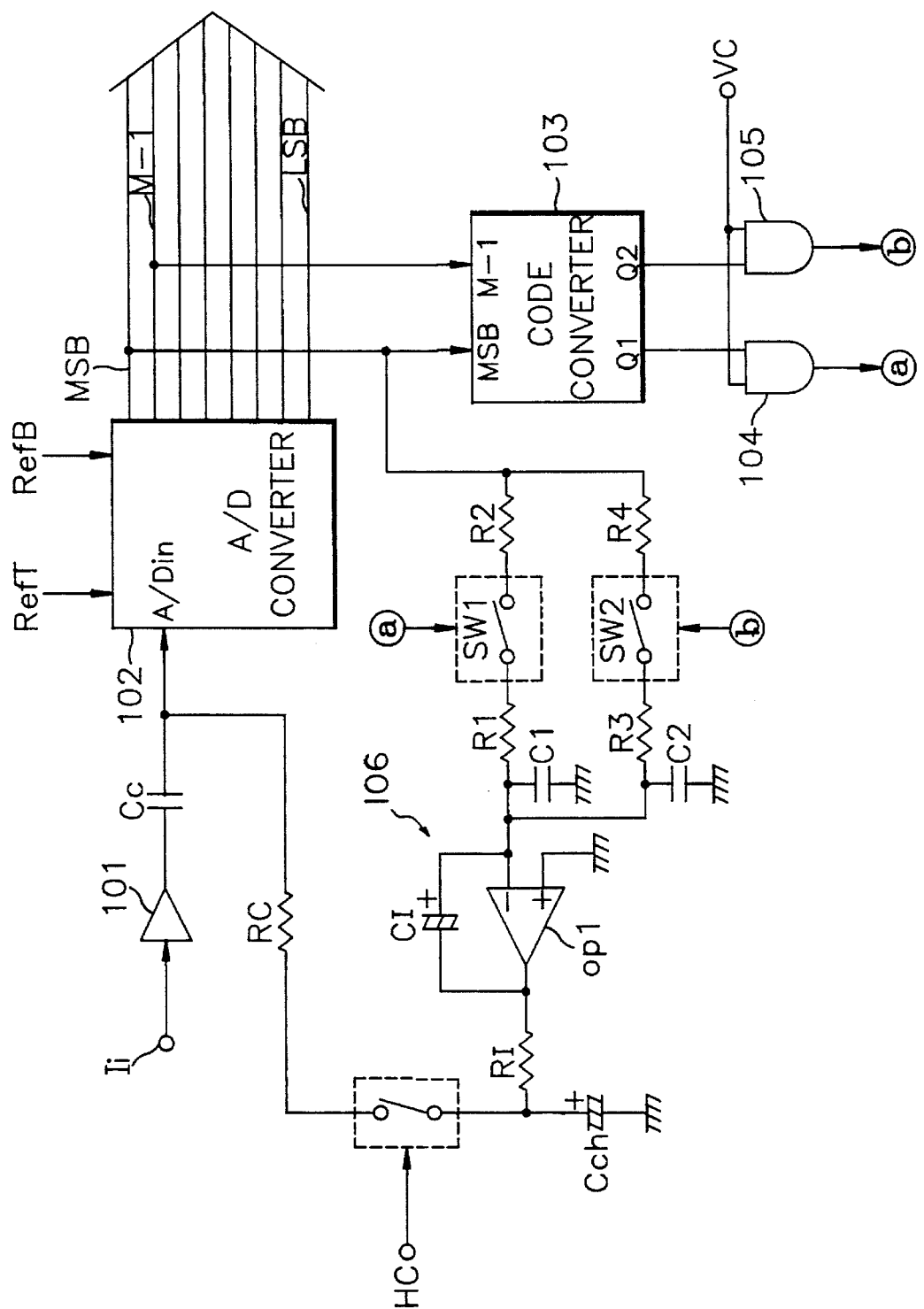
FIG. 1 is a schematic diagram of a conventional clamp circuit.
Figure 2:
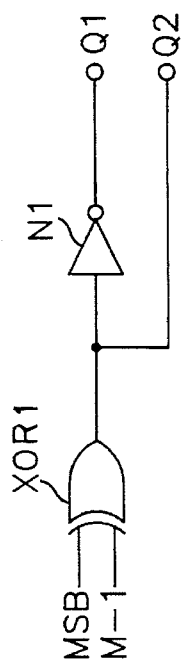
FIG. 2 is a detailed schematic diagram of the code converter 103 employed in FIG. 1.

According to a preferred embodiment of the present invention, it is intended to rapidly increase the speed of the clamping response and to realize variable gain control methods over a wide range. The preferred circuit configuration which permits variable gain control methods to be employed, includes two additional switches SW3, SW4, which are provided in parallel to switches SW1, SW2, e.g., FIG. 1, and a code converter 403 which generates first through fourth signals for controlling the four switches SW1–SW4, respectively. That is, the code converter 403 generates control signals Q1–Q4 for controlling the operation of switches SW1–SW4, respectively, as indicated in Table 2, in accordance with input levels of the high order bits (MSB, M–1, M–2, M–3) output from the A/D converter 102.

TABLE 2

| MSB | M-1 | M-2 | M-3 | Q1 | Q2 | Q3 | Q4 |
|-----|-----|-----|-----|----|----|----|----|
| 1 | 1 | 1 | 1 | 1 | 0 | 0 | 0 |
| 1 | 1 | 1 | 0 | 1 | 0 | 0 | 0 |
| 1 | 1 | 0 | 1 | 1 | 0 | 0 | 0 |
| 1 | 1 | 0 | 0 | 1 | 0 | 0 | 0 |
| 1 | 0 | 1 | 1 | 0 | 1 | 0 | 0 |
| 1 | 0 | 1 | 0 | 0 | 1 | 0 | 0 |
| 1 | 0 | 0 | 1 | 0 | 0 | 1 | 0 |
| 1 | 0 | 0 | 0 | 0 | 0 | 0 | 1 |
| 0 | 1 | 1 | 1 | 0 | 0 | 0 | 1 |
| 0 | 1 | 1 | 0 | 0 | 0 | 1 | 0 |
| 0 | 1 | 0 | 1 | 0 | 1 | 0 | 0 |
| 0 | 1 | 0 | 0 | 0 | 1 | 0 | 0 |
| 0 | 0 | 1 | 1 | 1 | 0 | 0 | 0 |
| 0 | 0 | 1 | 0 | 1 | 0 | 0 | 0 |
| 0 | 0 | 0 | 1 | 1 | 0 | 0 | 0 |
| 0 | 0 | 0 | 0 | 1 | 0 | 0 | 0 |

Figure 4:
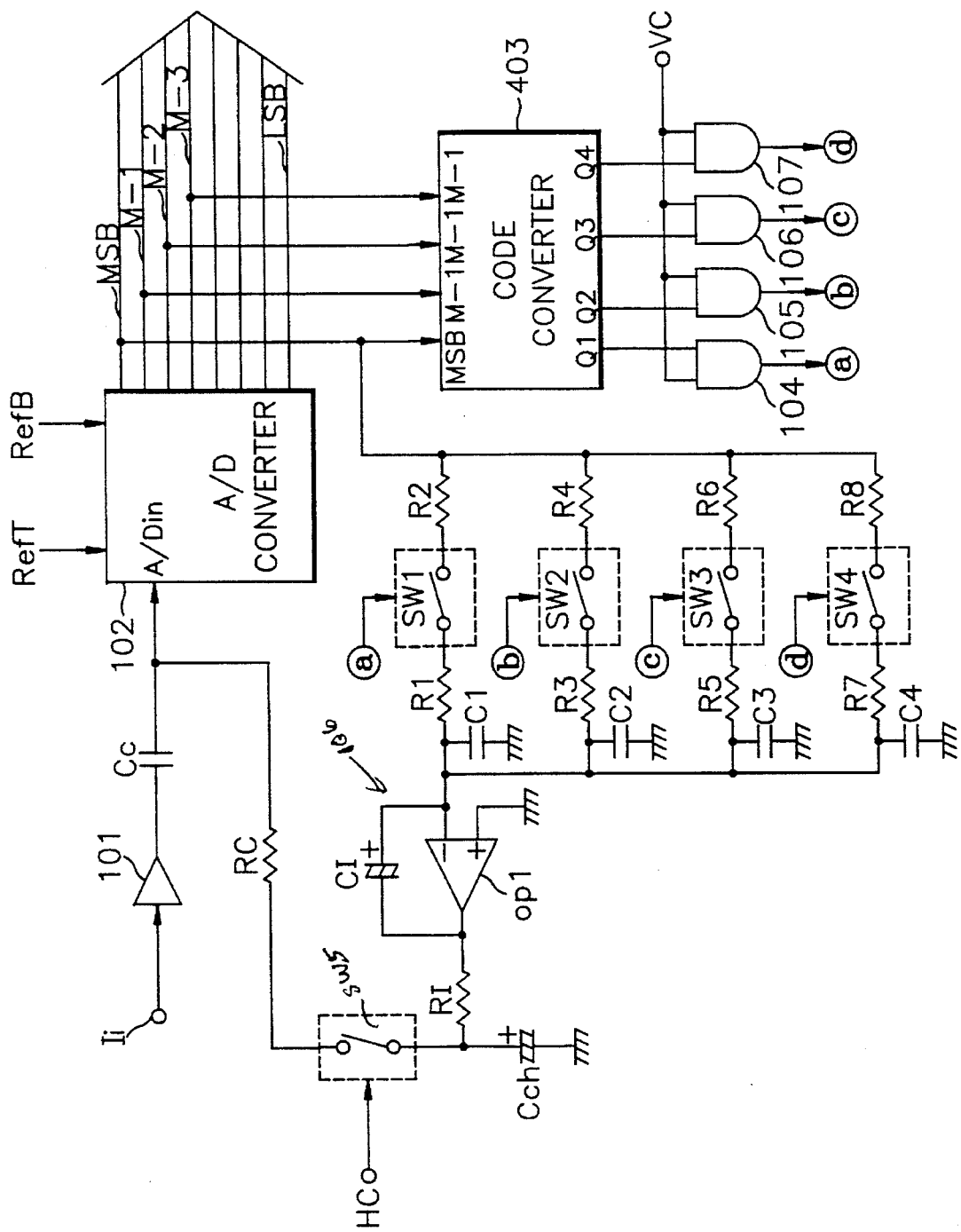
FIG. 4 is a schematic diagram of an adaptive clamping circuit according to an embodiment of the present invention.

The outputs Q1–Q4 of the code converter 403 are applied to AND gates 104–107, respectively. When a vertical clamp signal applied to a vertical clamp terminal VC is "high", AND gates 104–107 control operations of switches SW1–SW4 in conjunction with the output values Q1–Q4 of the code converter 403. Switches SW1–SW4 all receive the value of the MSB signal and thereafter, the selected values are input to RC elements R1/R2/C1, R3/R4/C2, R5/R6/C3 and R7/R8/C4 where the input value is delayed owing to the time constant of the selected path. The adaptively delayed value is then integrated via the operational amplifier OP1 and the capacitor CI, and the integrated signal is then applied to a capacitor $C_{ch}$ which is used in performing an adaptive clamping operation. In an exemplary case, the values of resistances R1–R8 and capacitors C1–C4, $C_I$, $C_{ch}$, $C_c$ of FIG. 4 are as indicated in Table 3 below.

TABLE 3

| Element | Value | Element | Value |
|---------|-------|---------|-------|
| R1 | 100 Ω | C1 | 0.1 µf |
| R2 | 100 Ω | C2 | 0.01 µf |
| R3 | 500 Ω | C3 | 0.001 µf |
| R4 | 15 KΩ | C4 | 0.001 µf |

TABLE 3-continued

| Element | Value | Element | Value |
|---------|-------|---------|-------|
| R5 | 1.5 KΩ | CI | 4.7 μf |
| R6 | 1.5 KΩ | $C_{ch}$ | 1.00 μf |
| R7 | 2.0 KΩ | $C_c$ | 0.01 μf |
| R8 | 2.0 KΩ | | |
| Rl | 470 Ω | | |
| Rc | 500 Ω | | |

It will be appreciated that buffer 101 serves to remove noise from an analog signal, e.g., a video or audio signal, applied to the input terminal Ii and, at the same time, amplify the analog signal. The output signal of buffer 101 is input to the A/D converter 102, which converts the analog signal into a digital signal. Typically, the clamping range for the input terminal Ii is between the input ranges of the terminal Ref B and the terminal Ref T, where Ref T is equal to a maximum reference level, and Ref B is equal to a minimum reference level, while converting the analog signal into a digital signal. Here, when an analog signal input to the A/D converter 102 is between Ref T (Reference Top) and Ref B (Reference Bottom), the analog signal is completely converted into a digital signal. The digital signal output from the A/D converter 102 is input to a further digital signal processing circuit (not shown).

During the output of the digital signal from the AID converter 102, the MSB and bits M–1, M–2, and M–3, i.e., signals corresponding to the top portion level of a video signal, are input to code converter 403. Here, the signal corresponding to the MSB is connected to switches SW1–SW4 via resistances R2, R4, R6, R8, respectively.

Figure 5:
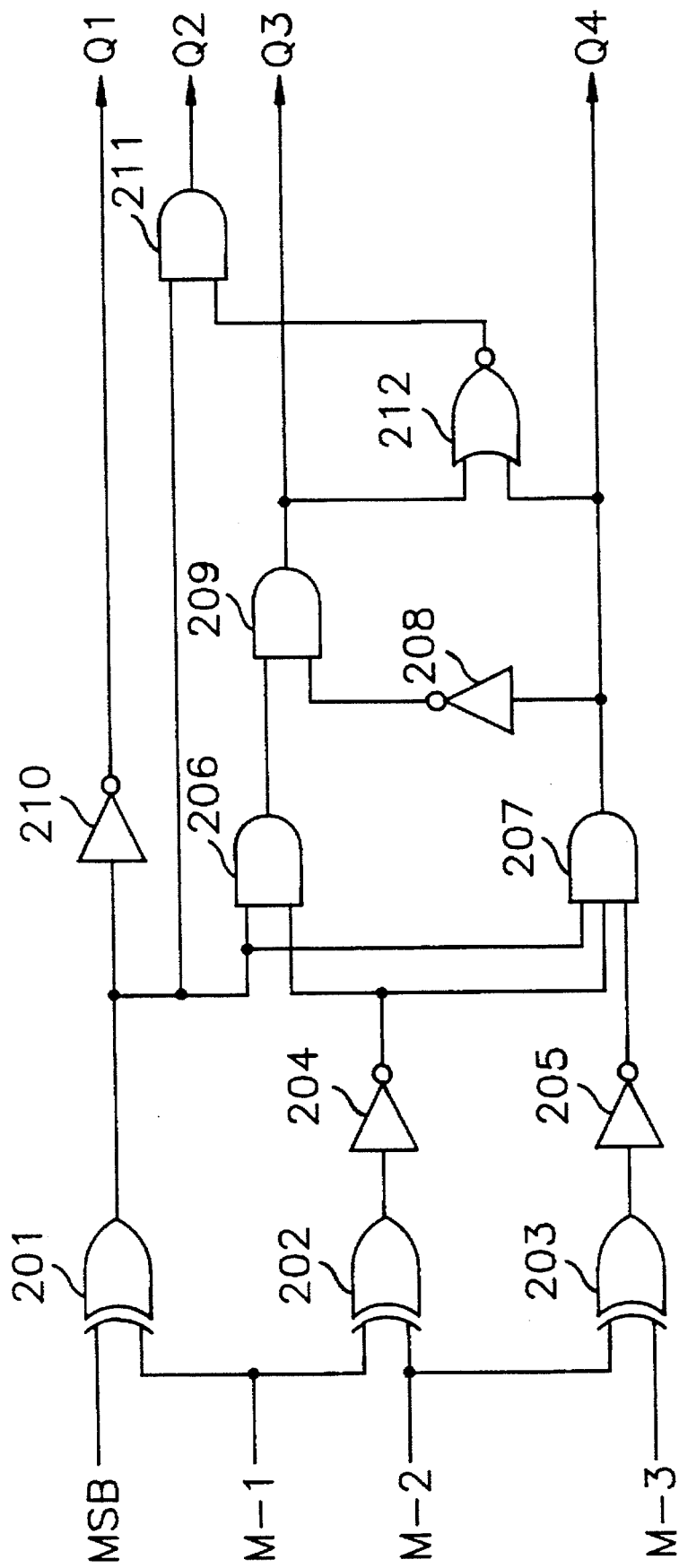
FIG. 5 is a detailed diagram of a code converter 403 used in FIG. 4 according to an embodiment of the present invention.

The bit signals input to the code converter 403 can advantageously be input to exclusive OR gates 201–203, as shown in FIG. 5. The output signal of the exclusive OR gate 201 is inverted by inverter 210 to become the output Q1, which serves to control the operation of the switch SW1 via AND gate 104. When the MSB signal is "1" and the M–1 signal is "1", it suggests a higher level than the reference level of the input signal is being output. On the contrary, when the MSB signal is "0" and the M–1 signal is "0", it suggests that a lower level than the reference level of the input signal is being attached. Therefore, the output of the exclusive OR gate 202 becomes a control signal for rapidly controlling the clamping operation. The outputs of the exclusive OR gates 202, 203 are inverted by inverters 204, 205, respectively. The outputs of the inverter 204 and the exclusive OR gate 201 are input to AND gates 206, 207, respectively. It will be noted that only when the values of the input signals are all "high", is the value indicative of detection generated.

When the input signal reaches a clamping operation state, the output of AND gate 207 serves to operate the switch SW4 via AND gate 107 of FIG. 4. Here, upon turning on the switch SW4, the clamping action operates slowly.

The output of the AND gate 206 is directly input to an AND gate 209 and the output of the AND gate 207 is input to the AND gate 209 via the inverter 208. the outputs of AND gates 207, are 209 input to a NOR gate 212. Then, the outputs of the NOR gate 212 and the exclusive OR gate 201 are input to an AND gate 211. Therefore, respective state of output terminals Q2, Q3, Q4 of the AND gates 211, 209, 207 enables switches SW2–SW4 to be turned on/off. The clamping operation owing to turning on the switch SW3 is generally performed more slowly than that of the switch SW2.

The reason for adjustment of a clamping speed in accordance with the operation of switches SW1–SW4 is in that resistances R1, R3, R5, R7 and capacitors C1–C4 connected downstream of the switches SW1–SW4 are designed to variably determine the RC time constants, as indicated in Table 3.

Four switches are used in the preferred embodiment of the present invention, although it is advantageously possible to have more switches than four switches. If more than four switches are used, it is easier to attain stability during the clamping operation, but it renders the configuration of the code converter 403 more complicated. As a result, it is difficult to adjust speed of the clamping operation. Therefore, it is desirable to properly select the number of switch is employed in the circuit.

Figure 3:
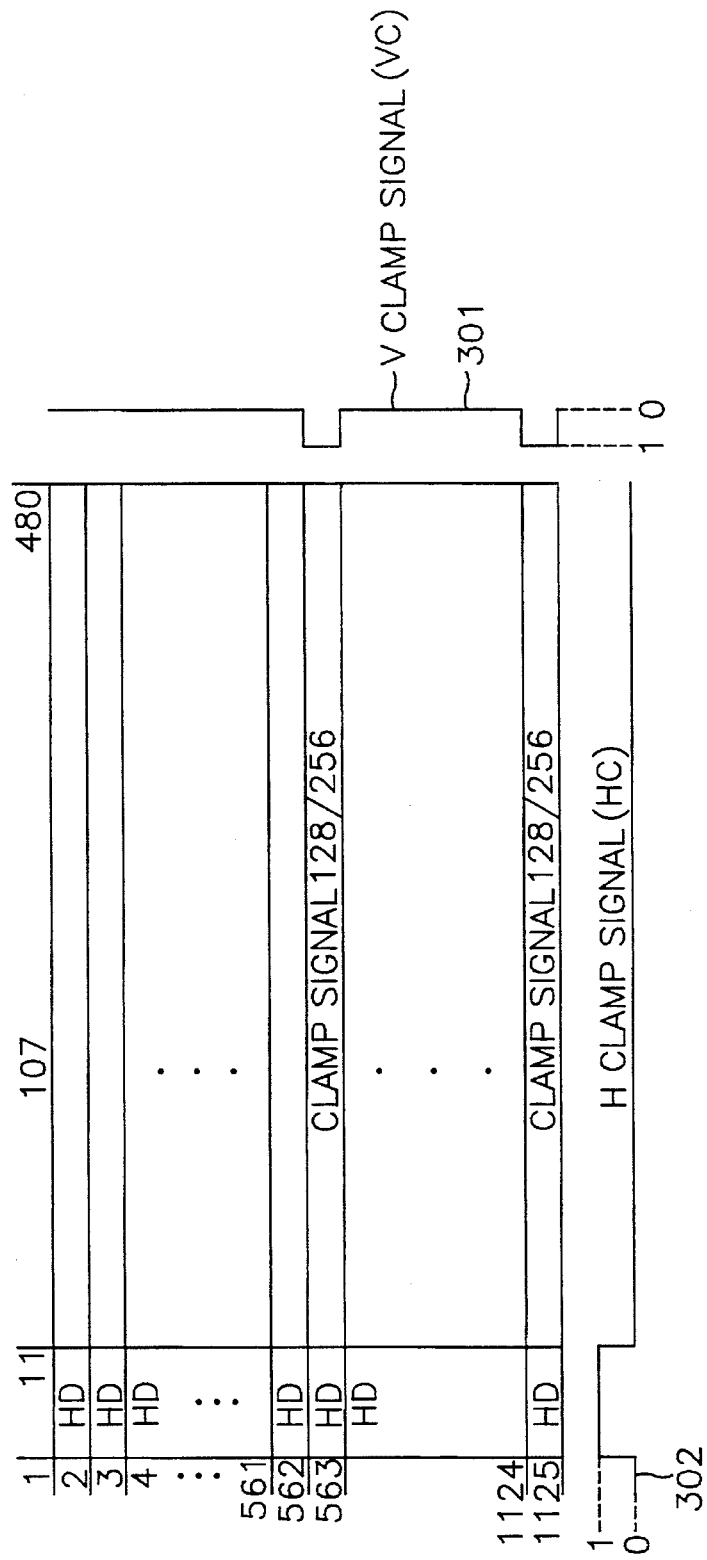
FIG. 3 is an exemplary illustration of the configuration of 2 fields signals in a MUSE signal applied according to an embodiment of the present invention.

According to the preferred embodiment of the present invention, four switches SW1–SW4 are employed for the purpose of improving a response speed of the clamping signal in an initial state while achieving increased stability of a clamping signal in a steady state. Digital data is converted by the A/D converter 102 and controls the operation of switches SW1–SW4 only during the clamping processing domain corresponding the output of a MUSE signal by the vertical clamp signal applied via the vertical clamp terminal VC to AND gates 104–107, according to the logic value generated from the code converter 403, as indicated in Table 2. The MSB signal is then RC filtered through a circuit comprising resistances R1, R3, R5, R7 and capacitors C1–C4 under the control of switches SW1–SW4. This filtered signal is advantageously integrated by operational amplifier OP1 and capacitor CI to become direct current signal and thereafter, accumulated capacitor $C_{ch}$. The capacitor $C_{ch}$ is charged in response to a signal applied at horizontal clamp terminal HC so as to set the direct current in the portion of the horizontal duration HD 302 of every line, as shown in FIG. 3.

As a result, the charge voltage of the capacitor $C_{ch}$ generated from the integration action of operational amplifier OP1 and capacitor CI serves to raise the direct current voltage level of a signal being applied to the A/D converter 102. Since clamp levels are different from one another, depending upon operation of the various switches SW1–SW4, it is desirable that the clamp operation be performed at a high speed by switch SW1, whereas, the clamp operation is performed at a low speed in response to operation switch SW4.

As indicated in Table 2, the switch SW1 is turned on when there is a larger differential between a reference level and a level to be clamped, e.g., when the received clamp signal generates codes "01111111" or "10000000". The switch SW4 is turned on when there is only a small differential between the reference level and the level to be clamped. Therefore, when a clamping voltage is supplied within the $$\frac{128}{256} - \frac{RefT - RefB}{4}$$

range, as the charge voltage is raised at high speed by the switch SW1, the capacitor $C_{ch}$ is rapidly charged. In charging to the capacitor $C_{ch}$, the switch SW2 operates at a lower speed than that obtained by operation of switch SW1. Further, if the clamping voltage is supplied within the $$\frac{128}{256} - \frac{RefT - RefB}{8}$$

range, the capacitor $C_{ch}$ is charged by the operation of the switch SW3 and if the clamping voltage is supplied within the $$\frac{128}{256} - \frac{RefT - RefB}{16}$$

range, the capacitor $C_{ch}$ is charged by the operation of the switch SW4. Within the $$\frac{128}{256} - \frac{RefT - RefB}{16}$$

range, the clamping operation is performed at its lowest speed, however, the clamping operation is most precisely performed.

Therefore, switches SW1–SW4 operate in order, so that a signal may reach a steady state at a high speed. After arriving at the steady state, the switch SW4 brings a stable state to the signal by a precise operation.

It will be appreciated that switches SW1–SW4 are shifted to the "ON" state when the output of AND gates 104–107 is at a high level. AND gates 104–107 generate a signal which is at the high level or a signal which is at the low level according to the output terminals Q1–Q4 of the code converter 403 and the signal applied to the vertical clamp signal terminal $V_c$. The output MSB of the A/D converter 102 is always applied to the code converter 403 and the switches SW1–SW4. As shown in TABLE 2, although the MSB applied to code converter 403 is sometimes at a "0" level, the state of the output terminals Q1–Q4 of the code converter 403 does not always become the "0" level. Thus, although the output of the MSB is at "0" level, since the output of AND gates 104–107 is not at the "0" level through the output of the code converter 403, none of the switches SW1–SW4 are turned off.

It should also be noted that when one of the outputs of the AND gates 104–107 is at the high level, only the corresponding switch it shifted to the "ON" state. Although the MSB is at the "0" level, clapping is still advantageously possible. Since the input terminal of operation amplifier OP1 is at an "OPEN" state or "SHORT" state, the level value of a predetermined minute charge is generated by the driving voltage of the operation amplifier OPI and by the subsequent integration of the capacitor $C_{ch}$. Thus, since the charged voltage of the capacitor $C_{ch}$ is added thereto, the necessary predetermined clamping advantageously can be generated, so that the desired corresponding clamping is achieved.

As discussed above, the adaptive clamping operation is performed rapidly and stably in response to the input signal, so that it is possible to prevent flickering and instability in an input image signal, as well as distortion of an audio signal.

While there is shown and described the preferred embodiment of the invention, it will be understood by those skilled in the art that foregoing and other changes in form and details may be made without departing from the spirit and scope of the present invention.

What is claimed is:

1. An adaptive clamping circuit for a video signal processing device, comprising:

control signal generating means for generating a control signal controlling speed of clamping operation of an input signal provided to said video signal processing device;

variable response signal generating means for generating a variable response gain signal which enables said input signal to be adaptively clamped, by selecting one of N time constants as a selected time constant for transmission of a most significant bit (MSB) signal, where N is an integer greater than 2, said selected time constant being adaptively changed in response to said control signal of said control signal generating means; and clamping means for generating a direct current signal responsive to an output of said variable response signal generating means and for applying the direct current signal to said input signal.

2. The adaptive clamping circuit as claimed in claim 1, wherein said control signal generating means comprises:

a code converter detecting a level of said input signal based on N bits representing said input signal; and a plurality of logical elements receiving respective outputs of said code converter for generating said control signal for selecting said selected time constant of said variable response signal generating means during a time period associated with vertical clamping of said input signal.

3. The adaptive clamping circuit as claimed in claim 2, wherein said logical elements comprise AND gates, each of said AND gates receiving a predetermined one of said respective outputs of said code converter and a clamp signal indicative of said time period.

4. The adaptive clamping circuit as claimed in claim 1, wherein said variable response signal generating means comprises:

N switches, each of which is permitted to be turned on during a clamping operation responsive to the output of said control signal generating means; and N resistor-capacitor networks respectively operated by said N switches for generating associated said N time constants, thereby permitting said MSB signal to be filtered using said selected time constant.

5. An adaptive clamping circuit for a video signal processing device, comprising:

an A/D converter generating a digital signal from an input signal to said video signal processing device;

variable gain controlling means for providing a gain control value for adaptively clamping said input signal to said A/D converter using N variable connections each having an associated time constant, where N is an integer greater than 2;

adaptive response means for providing the output of said variable gain controlling means to said input signal responsive to a horizontal clamping control signal permitting application of a direct current component of a horizontal synchronous signal of said input signal; and control signal generating means for generating a control signal for selecting one of said N variable connections so as to control variable gains provided by said variable gain controlling means during a clamping operation in response to high level bits of said digital signal output from said A/D converter.

6. The adaptive clamping circuit for a video signal processing device as claimed in claim 5, wherein N is 4.

7. An adaptive clamping circuit in a video signal processing device, comprising:

an A/D converter generating a digital signal from an input signal to said video signal processing device;

control signal generating means receiving a predetermined number of bits of said digital signal representing level of said digital signal for generating a control signal controlling clamping speed of said input signal;

variable gain controlling means for providing a gain control value for adaptively clamping said input signal to said A/D converter using N variable connections each having an associated time constant, where N is an integer greater than 2, by selecting one of N time constants as a selected time constant for transmission of a digital bit signal corresponding to one of said predetermined number of bits, said selected time constant being selected in response said control signal of said control signal generating means; and clamping means for generating a direct current signal based on an output of said variable response signal generating means and for applying the direct current signal to said input signal responsive to a horizontal clamping control signal permitting application of a direct current component of a horizontal synchronous signal of said input signal.

8. The adaptive clamping circuit as claimed in claim 7, wherein said control signal generating means comprises:

code converting means receiving said predetermined number of bits representing said level of said input signal for generating a coded output; and logical means receiving said coded output for generating said control signal by logical combination of said coded output with a clamping signal representing a predetermined portion of said input signal.

9. The adaptive clamping circuit as claimed in claim 8, wherein said logical means comprises a plurality of AND gates.

10. The adaptive clamping circuit as claimed in claim 7, wherein said N time constants are inversely proportional to a difference between a reference portion of said input signal and said input signal.

11. The adaptive clamping circuit as claimed in claim 7, wherein said variable gain controlling means comprises:

N switches, each of which is permitted to be turned on during a clamping operation responsive to said control signal; and N resistor-capacitor networks respectively operated by said N switches for generating associated said N time constants, thereby permitting said bit signal to be filtered according to said selected time constant.

* * * * *